United States Patent
Kol et al.

(10) Patent No.: US 10,304,213 B2
(45) Date of Patent: May 28, 2019

(54) NEAR LOSSLESS COMPRESSION SCHEME AND SYSTEM FOR PROCESSING HIGH DYNAMIC RANGE (HDR) IMAGES

(71) Applicant: Intel Corporation, Santa Clara, CA (US)

(72) Inventors: Rakefet Kol, Haifa (IL); Rony Zatzarinni, Haifa (IL); Hadas Dahan, Tel Aviv (IL); Pavel Kounitsky, Holon (IL)

(73) Assignee: Intel Corporation, Santa Clara, CA (US)

( * ) Notice: Subject to any disclaimer, the term of this patent is extended or adjusted under 35 U.S.C. 154(b) by 149 days.

(21) Appl. No.: 15/391,239

(22) Filed: Dec. 27, 2016

(65) Prior Publication Data
US 2018/0182127 A1 Jun. 28, 2018

(51) Int. Cl.
G06K 9/36 (2006.01)
G06T 9/00 (2006.01)
G06T 1/20 (2006.01)

(52) U.S. Cl.
CPC . *G06T 9/00* (2013.01); *G06T 1/20* (2013.01)

(58) Field of Classification Search
CPC . G06T 2207/20208; G06T 2207/20212; G06T 5/007; H04N 19/98; H04N 19/184; H04N 5/355
See application file for complete search history.

(56) References Cited

U.S. PATENT DOCUMENTS

| | | | | |
|---|---|---|---|---|
| 2005/0070783 A1* | 3/2005 | Yanagita | ............ | A61B 6/00 600/407 |
| 2007/0172120 A1* | 7/2007 | Roimela | ............ | G06T 9/00 382/166 |
| 2010/0296745 A1* | 11/2010 | Strom | ............ | H04N 19/176 382/233 |
| 2011/0206117 A1* | 8/2011 | Bivolarsky | ............ | H04N 19/105 375/240.12 |

* cited by examiner

*Primary Examiner* — Euengnan Yeh
(74) *Attorney, Agent, or Firm* — International IP Law Group, P.L.L.C.

(57) ABSTRACT

An apparatus for a near lossless compression scheme is described herein. The apparatus includes an image processing pipeline and a compressor. The image processing pipeline is to apply a plurality of processing stages to high dynamic range images to output a plurality of intermediate processed images, wherein each image comprises a plurality of pixel components. The compressor is to generate compression tiles of the plurality of intermediate processed images, wherein each output of the plurality of processing stages is compressed independently of the other processing stage.

24 Claims, 7 Drawing Sheets

500

NEAR LOSSLESS COMPRESSION SCHEME AND SYSTEM FOR PROCESSING HIGH DYNAMIC RANGE (HDR) IMAGES

BACKGROUND ART

Memory buffers may be used to store intermediate values along a processing pipeline. For example, high dynamic range (HDR) images may be written to memory at various stages within an image processing pipeline. In particular, images may be written to memory several times during block-based processing within the encoding process.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Figure 1:
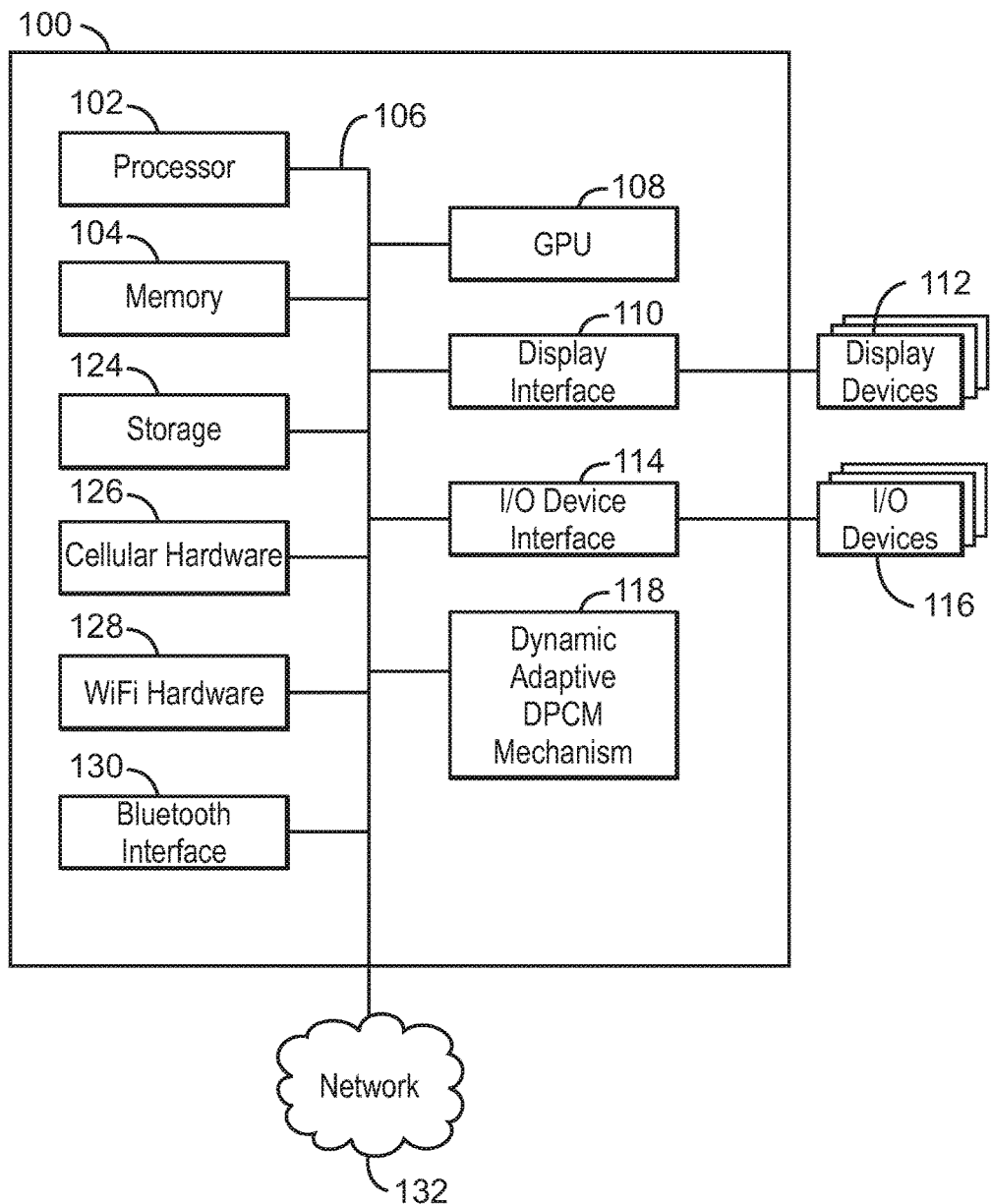
FIG. 1 is a block diagram of an electronic device that enables a near lossless compression scheme as applied to HDR images.

HDR images or videos can be realized via larger pixel values to represent the full range of an HDR image. HDR images often represent a range of luminance similar to that of the human visual system. Thus, the HDR images often reproduce a greater dynamic range of luminosity than is possible with standard digital imaging or photographic techniques. With the increased requirements in terms of pixel processing and higher dynamic range values, the image processing units require more and more memory bandwidth to process these images. The increase in bandwidth may approach the natural bandwidth limit of a system on chip (SOC), and also implies increase in power which might bring the device to the thermal limit for both the package and the T-Junction. Compressing the data before storing it in the memory reduces power as well as the required memory foot print. However, compression at intermediate stages in the image processing pipeline may result in degraded image quality.

Embodiments described herein enable a near lossless compression scheme and system for processing high dynamic range (HDR) images. The present techniques include at least one image capture mechanism to capture a bitstream of image data. The apparatus also includes an adaptive differential pulse code modulation (DPCM) mechanism that is to compress the image data based on a difference value and a content of the pixel data, wherein the compressed image data is stored within a memory buffer.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the inventions. The various appearances of "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

FIG. 1 is a block diagram of an electronic device 100 that enables a near lossless compression scheme as applied to HDR images. The electronic device 100 may be, for example, a laptop computer, tablet computer, mobile phone, smart phone, or a wearable device, among others. The electronic device 100 may include a central processing unit (CPU) 102 that is configured to execute stored instructions, as well as a memory device 104 that stores instructions that are executable by the CPU 102. The CPU may be coupled to the memory device 104 by a bus 106. Additionally, the CPU 102 can be a single core processor, a multi-core processor, a computing cluster, or any number of other configurations. Furthermore, the electronic device 100 may include more than one CPU 102. The memory device 104 can include random access memory (RAM), read only memory (ROM), flash memory, or any other suitable memory systems. For example, the memory device 104 may include dynamic random access memory (DRAM).

The electronic device 100 also includes a graphics processing unit (GPU) 108. As shown, the CPU 102 can be coupled through the bus 106 to the GPU 108. The GPU 108 can be configured to perform any number of graphics operations within the electronic device 100. For example, the GPU 108 can be configured to render or manipulate graphics images, graphics frames, videos, or the like, to be displayed to a user of the electronic device 100. In some embodiments, the GPU 108 includes a number of graphics engines, wherein each graphics engine is configured to perform specific graphics tasks, or to execute specific types of workloads.

The CPU 102 can be linked through the bus 106 to a display interface 110 configured to connect the electronic device 100 to one or more display devices 112. The display devices 112 can include a display screen that is a built-in component of the electronic device 100. The display devices 112 can also include a computer monitor, television, or projector, among others, that is externally connected to the electronic device 100.

The CPU 102 can also be connected through the bus 106 to an input/output (I/O) device interface 114 configured to connect the electronic device 100 to one or more I/O devices 116. The I/O devices 116 can include, for example, a keyboard and a pointing device, wherein the pointing device can include a touchpad or a touchscreen, among others. The I/O devices 116 can be built-in components of the electronic device 100, or can be devices that are externally connected to the electronic device 100.

The electronic device 100 also includes a dynamic adaptive DPCM mechanism 118. The dynamic adaptive DPCM mechanism 118 may be configured to enable memory bandwidth reduction when reading/writing intermediate image processing pipeline values, while enabling a high throughput of pixel processing per clock cycle. In embodiments, the number of bits used to represent each pixel value is dynamically adaptive. The number of bits may change based on, at least in part, the content of each pixel value. Additionally, as used herein intermediate values include those values that are calculated during an image processing pipeline.

The storage device 124 is a physical memory such as a hard drive, an optical drive, a flash drive, an array of drives, or any combinations thereof. The storage device 124 can store user data, such as audio files, video files, audio/video files, and picture files, among others. The storage device 124 can also store programming code such as device drivers, software applications, operating systems, and the like. The programming code stored to the storage device 124 may be executed by the CPU 102, GPU 108, or any other processors that may be included in the electronic device 100.

The CPU 102 may be linked through the bus 106 to cellular hardware 126. The cellular hardware 126 may be any cellular technology, for example, the 4G standard (International Mobile Telecommunications—Advanced (IMT-Advanced) Standard promulgated by the International Telecommunications Union—Radio communication Sector (ITU-R)). In this manner, the PC 100 may access any network 132 without being tethered or paired to another device, where the network 132 is a cellular network.

The CPU 102 may also be linked through the bus 106 to WiFi hardware 128, The WiFi hardware is hardware according to WiFi standards (standards promulgated as Institute of Electrical and Electronics Engineers' (IEEE) 802.11 standards). The WiFi hardware 128 enables the electronic device 100 to connect to the Internet using the Transmission Control Protocol and the Internet Protocol (TCP/IP), where the network 132 is the Internet. Accordingly, the electronic device 100 can enable end-to-end connectivity with the Internet by addressing, routing, transmitting, and receiving data according to the TCP/IP protocol without the use of another device. Additionally, a Bluetooth Interface 130 may be coupled to the CPU 102 through the bus 106. The Bluetooth Interface 130 is an interface according to Bluetooth networks (based on the Bluetooth standard promulgated by the Bluetooth Special Interest Group). The Bluetooth Interface 130 enables the electronic device 100 to be paired with other Bluetooth enabled devices through a personal area network (PAN). Accordingly, the network 132 may be a PAN. Examples of Bluetooth enabled devices include a laptop computer, desktop computer, ultrabook, tablet computer, mobile device, or server, among others.

The block diagram of FIG. 1 is not intended to indicate that the electronic device 100 is to include all of the components shown in FIG. 1. Rather, the computing system 100 can include fewer or additional components not illustrated in FIG. 1 (e.g., sensors, power management integrated circuits, additional network interfaces, etc.). The electronic device 100 may include any number of additional components not shown in FIG. 1, depending on the details of the specific implementation. Furthermore, any of the functionalities of the CPU 102 may be partially, or entirely, implemented in hardware and/or in a processor. For example, the functionality may be implemented with an application specific integrated circuit, in logic implemented in a processor, in logic implemented in a specialized graphics processing unit, or in any other device.

Figure 2:
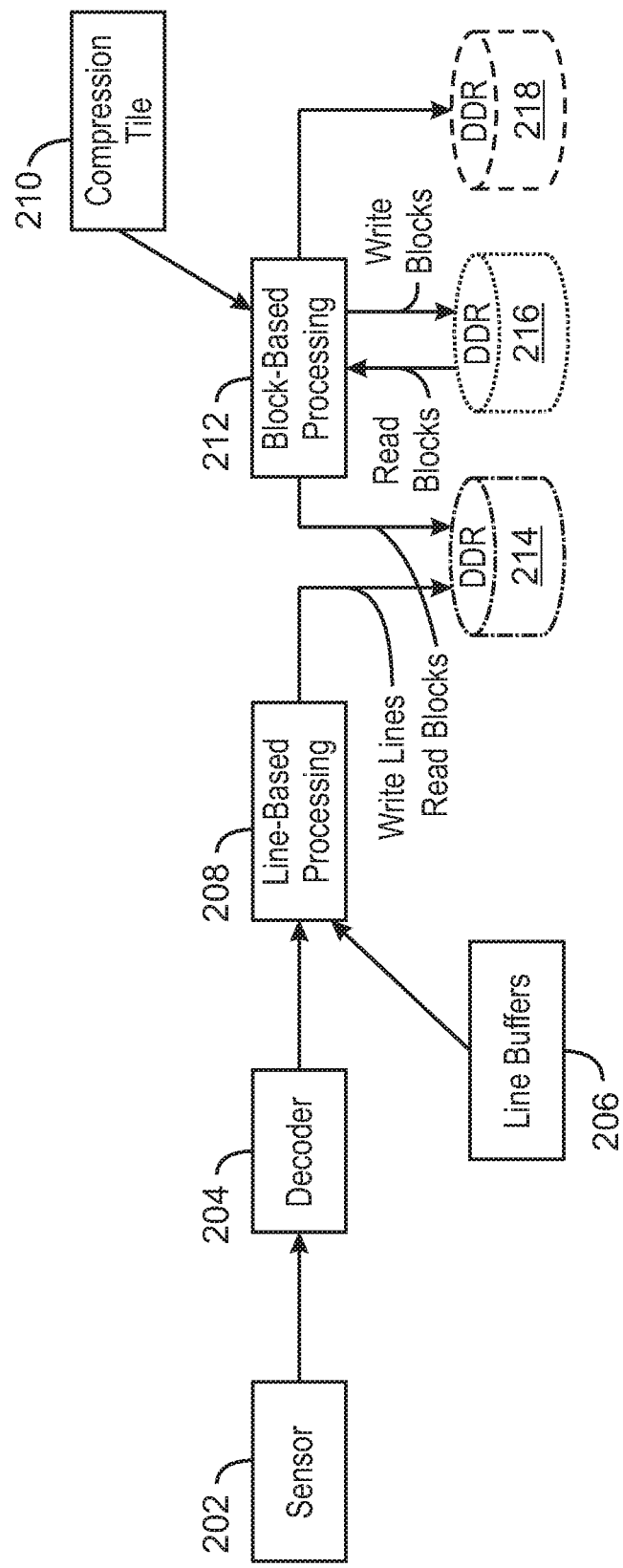
FIG. 2 is a block diagram of an image processing pipeline.

FIG. 2 is a block diagram of an image processing pipeline 200. The image processing pipeline 200 may apply the dynamic adaptive DPCM mechanism to intermediate values stored during the processing pipeline. High dynamic range images may have pixel values that are represented by more than 8-bits per pixel component. For example, in an HDR image frame, each pixel component may use at least 10- or 12-bit values. The data received from an imaging sensor is often 10 bits (or higher) per pixel color component. In cases where the final processed HDR image results in only 8 bits per pixel component, an internal imaging algorithm pipeline applies a higher bit precision to the calculations and resulting values for the intermediate processed images thereby using at least 10 to 12 bits for those pixel components.

In embodiments, the first part of the image signal processing (ISP) pipe processes image lines and image stripes, while the second part of the ISP pipe processes image blocks. The compression scheme described here supports random access into the stored intermediate processed images. The image processing pipeline 200 is to process high dynamic range (HDR) images. A sensor 202 may be used to capture video data. The sensors used to capture video data include, but are not limited to, a depth sensor, red, green, blue (RGB) sensor, a complementary metal-oxide semiconductor (CMOS) sensor, a charge-coupled device sensor (CCD), and active pixel sensor, and the like. The data may be captured via a plurality of pixels. Each frame of the video data includes a large number of pixels.

Each pixel may be represented by several components. For example, in the YUV color space, pixel data is represented by one luma (Y) and two chrominance (UV) components. Each pixel component is represented by a plurality of bits and is encoded separately from the other pixel components. A decoder block 204 may be used to convert incoming bits of video data captured by the sensor 202 to parallel data. In embodiments, the decoder block may be a Mobile Industry Processor Interface (MIPI) decoder. The decoder block 204 is to segment the incoming bits or bytes of image data into cachelines of a known size.

A plurality of line buffers 206 are used to process the data as broken into cachelines during the line based processing at block 208. Line-based processing 208 on the plurality of line buffers 206 enables the video data to be processed in raster-order. However, some operations of the imaging pipeline are applied to blocks of data. Accordingly, the data may be structured as a plurality of compression tiles 210 for block based image processing at block 212. The block based processing may include several imaging operations, such as Geometric Distortion Correction (GDC), Temporal Noise Reduction (TNR) processing, and output stage processing.

After each operation, data may be stored in a memory system. In embodiments, the memory system is a double data rate (DDR) memory. For example, the memory may be DDR memory modules or double data rate synchronous dynamic random-access memory (DDR SDRAM). The DDR memory may be partitioned into a plurality of buffers, where data is written to or read from the buffer 64-bits at a time. This results in a DDR transfer rate of 1600 MB/s. The imaging operations may continuously read and write image data to a block stored on a DDR. The processing pipeline includes intermediate buffers stored in DDR. The intermediate buffers can store intermediate values in the encoding process.

For example, a first imaging operation may store data at a buffer 214 of the DDR. A second operation may read/write data at a buffer 216 of the DDR. An third output operation may read/write data at a buffer 218 of the DDR. While the buffers 214, 216, and 218 are illustrated as separate blocks of data on the DDR, the buffers may be shared buffers.

When transitioning from line based processing to block based processing in an ISP pipeline, there may be a need to access the intermediate images as processed in a block fashion. If the compression is applied from the beginning of the pipeline to the end of the pipeline, each time intermediate data is accessed, a decompression step must be performed from the beginning of the pipeline to the stage where the data is accessed in order to accurately reproduce the compressed image. The present techniques enable various data access points without a decompress operation from the beginning of the pipeline. Instead, pixel components at various stages of the image processing pipeline are compressed independently from other stages. Each stage may apply a dynamic adaptive DPCM encoding scheme to data stored in the buffers to reduce bandwidth as well as power. A decompress block is used to identify and find the differences which were coded with fewer bits, and decode the compression tile correctly, at the rate of four elements per cycle.

For HDR images and video, 10- or 12-bit high dynamic range values are usually stored in 16-bit containers in memory. As used herein, a container is a memory structure that is used to organize the memory such that it can be written to or read from in a predictable fashion. The data can be written to/read from the DDR buffer of up to 64-bytes per clock cycle, as a DDR cacheline is 64-bytes (512-bits) in size. By not completely using the entire bits of each container, memory storage bandwidth may be wasted. In some cases, the pixel component data is packed into DDR cachelines without compression. For example, when values of 10-bits each are stored in a 512-bit cacheline, the maximum number of pixel components that can be accessed per each clock cycle is 51 elements in one cacheline. Similarly, when values of 12-bits each are stored in a 512-bit cacheline, the maximum number of elements that can be accessed per each clock cycle is 42-elements in one cacheline. Note that in the exemplary DDR buffers, the 64-bytes of the cacheline must be read each clock cycle—regardless of if 51-elements or 42-elements are required.

Accordingly, storing pixel components without compression often results in an access granularity of 51 or 42 elements, respectively, which may complicate the required random access granularity. In particular, access granularity may be at a pixel level where random pixels can be accessed as needed by various processes. However, since the DDR accesses are at a cacheline granularity, random access granularity may be at every 32 pixels, where each set of 32 pixels is stored as 16-bits. In embodiments, the random access is needed when processing blocks from the image due to geometric distortion of the lenses, when searching for matching pixels between frames for temporal noise reduction, or similar intermediate processes.

The present techniques enable the packing of bits into a 64-bit cacheline, such that the entire cacheline includes imaging data, rather than only using 51- or 42-bits of the 64-bit DDR cacheline. Put another way, 64-elements of 10- or 12-bits can be packed into a single cacheline. The adaptive compression described herein uses about the same amount of area or footprint of 64-elements of 8-bits. The smart compression enables the present techniques to fit 64-elements of 10- or 12-bits into a DDR buffer.

Compressing the intermediate pixel component values can be used to reduce DDR memory bandwidth requirements, meet the limited SoC power budget (due to thermal issues), and enable the support of higher image resolutions and frame rates within a limited allocated DDR bandwidth. In addition to DDR bandwidth savings by compression, applying compression to internal line buffers enables the reduction in integrated package (IP) area and power, while preserving support for high image quality algorithms and maintaining the high dynamic range image processing. Compressing intermediate values in the image processing pipeline does not impact the final image quality.

Figure 3:
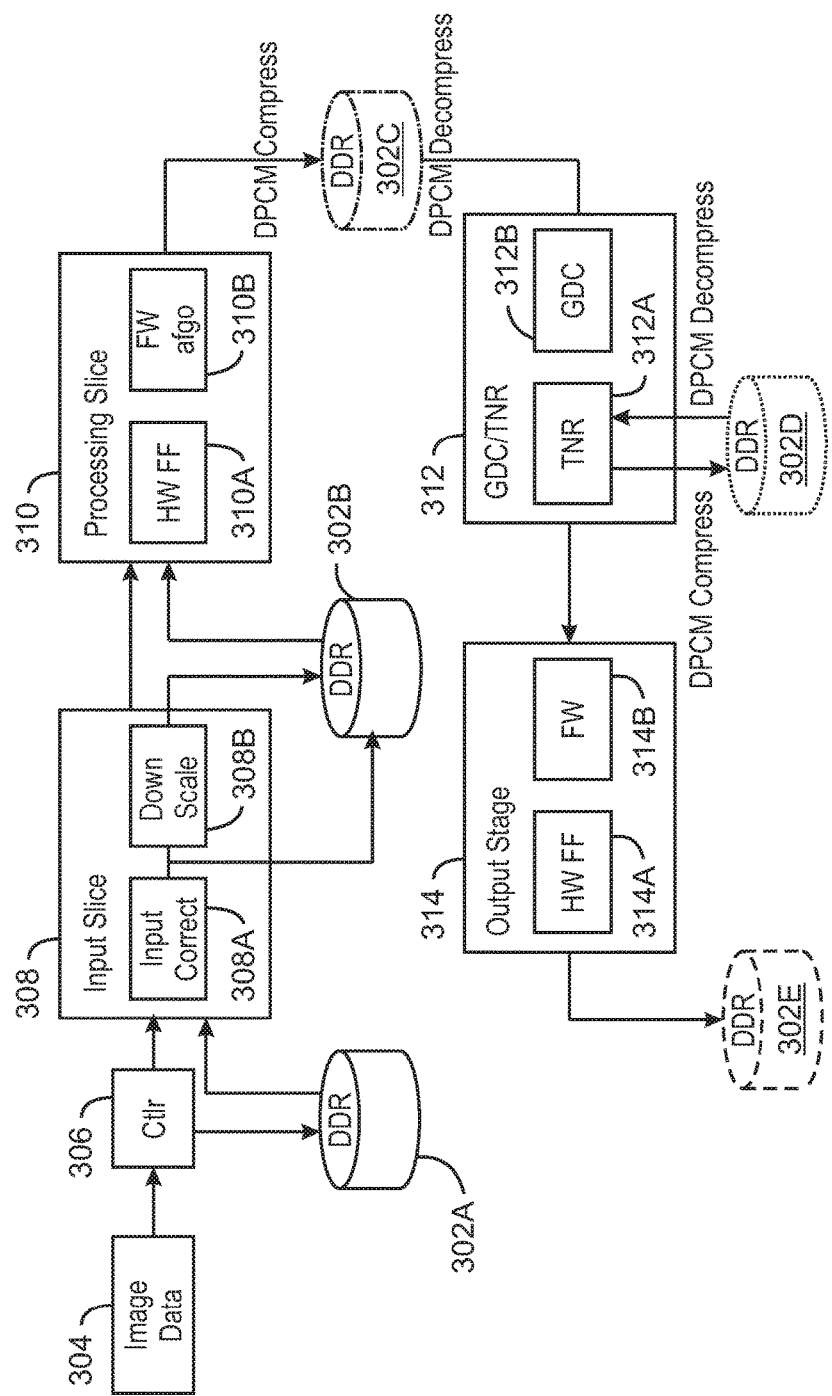
FIG. 3 is a block diagram of an image processing pipeline.

FIG. 3 is a block diagram of an image processing pipeline 300. The image processing pipeline 300 includes a memory system 302. The memory system 302 includes a DDR buffer 302A, DDR buffer 302B, DDR buffer 302C, DDR buffer 302D, and a DDR buffer 302E. Image data 304 from the image sensor may be initially processed by a controller 306. The controller 306 may be a MIPI controller. In embodiments, the controller 306 is to segment the data for line based processing during operations 308 and 310. During the processing of image data 304 from a sensor, various operations 308, 310, 312, and 314 may be applied to the image data 304.

At block 308, an input slice operation includes an input correction 308A and downscaling 308B. Input correction 308A may correct colors in lines of input data, while the downscaling 308B may scale the resolution of the data on a per line basis. The input corrected data and downscaled data may be read from or written to the DDR buffer 302B. At block 310, a processing slice operation/stage may be performed. The processing slice may include a hardware fixed function (FF) 310A operation and a firmware (FW) algorithm operation 310B. Blocks 310A and 3108 are for denoising, sharpening, de-mosaic and more. Some of the processes at blocks 310A and 310B are implemented in hardware, while others are implemented in firmware. In embodiments, the processing slice may implement other processing algorithms such as local tone mapping, color and edge enhancements, color space conversion, and the like. Data from the processing slice operation at block 310 may be written to the DDR buffer 302C after an adaptive DCPM compression is applied to the resulting data.

At block 312, a GDC/TNR operation/stage is performed. The GDC/TNR operation 312 may include a temporal noise reduction (TNR) 312A and a geometric distortion correction (GDC) 312B. Each of the TNR 312A and the GDC 312B is performed on blocks of data obtained from the DDR buffer 302C. In particular, the blocks of data may be obtained via compression tiles of size 32×2. Intermediate values from the TNR operation 312A may be written to/read from a DDR buffer 302D. At block 314, an output stage operation may be performed. Blocks 314 convert and pack the image into the desired output format. In embodiments, the output stage processing can include scaling, chroma up-sampling, and formatting the image according to various standard and proprietary image buffer formats. The output stage operation may include a hardware FF 314A operation and a FW algorithm operation 314B. Data from the processing slice operation/stage at block 314 may be written to the DDR buffer 302E.

The compression schemes described herein apply a dynamically adaptive DPCM technique to enable DDR bandwidth reduction, and the implementation enables a high throughput to match the processing throughput of the imaging pipeline (2-4 pixels per cycle). The compression enables a dynamically adaptive allocation of number of bits per pixel. Each pixel component type is compressed separately to take advantage of local similarities. For example, the component type may be of a Bayer format or a YUV4:2:0 format. The luma component may be compressed separately from the chroma components. Further, and the pixels may be very similar to nearby pixels, thereby enabling DPCM to encode the small residuals between the pixel component values.

In embodiments, the compression tile is defined as 32 pixels wide and 2 lines high, i.e., a tile of 32×2 pixel elements. Consider the following exemplary compression scheme using differential coding, wherein the value to be coded is based on the value of the current pixel as well as the value of the previous pixel. In embodiments, the value to be coded is the difference between the current pixel and the previous pixel. In a sequence of pixels coded per compression tile, the first pixel is not compressed, as there is no previous pixel to use for differential coding. In embodiments, the resolution of the first pixel may be slightly reduced by 1-bit through clipping the least significant bit (LSB). The compression of the other pixels in the compression tile is performed using the differences between adjacent pixels. The number of bits allocated to a compressed value is not fixed (which is different from what is done in a conventional DPCM), but rather spread within the whole compression block to compensate for the more bits allocated to the first pixel. More bits are allocated to the first pixel in a DPCM encoding scheme in order to retain the entire pixel value of the first pixel and so differentials can be used to encode the subsequent pixels. The subsequent pixels may be encoded using less bits, and differential values are often smaller than complete, uncompressed pixel values. In embodiments, the compression throughput is coded such that four pixels are processed per clock cycle.

For example, a compression tile of 32×2 pixels may be compressed into 64 bytes. Consider a luma pixel component with 32×2 values. The DCPM is used to compress the differences between pixels. The number of bits used to represent the first pixel is set with a fixed value of 10- or 12-bits. For purposes of this discussion 10-bits are allocated for the first pixel. When compressing the next pixel, the difference between that pixel and the first pixel is coded. The first pixel has been represented using 10-bits, however next pixel may be represented by 7- or 8-bits if the range of the pixel is small enough that 8 bits are not needed to code the calculated difference. If 10-bits are allocated to the first pixel, then during processing the remainder of the other pixels 2-bits are dropped to maintain and average of 8-bits for each pixel during the coding process. An average of 8-bits for each pixel enables 64-pixels (or pixel elements) to be packed into of 10- or 12-bits each within a 64-byte cacheline, where the 64-byte value represents the granularity for random DDR access: 64*8=512 bits=64 Bytes. For example, at some location in the DPCM coding there are at least two places where 7 bits are used to code the pixel component values instead of 8-bits. If no differences can be coded using 7-bits, then the last two pixels that is coded will be impacted because they will not be coded with the necessary bits. Rather, the last two pixels will be coded using the number of bits that remain to satisfy a budget for encoding this particular subset of pixels.

In embodiments, this configuration enables the compression of 64 pixel values of 12-bits each into a 64-byte unit (a DDR transaction unit). The DDR transaction unit is the maximum amount of data that can be retrieved from a DDR buffer for each clock cycle. In order to compress 64 HDR pixel values into a 64-byte unit, the number of bits used to represent each pixel component value is variable. This exemplary compression may result in an average of 8-bits per pixel (bpp). It also allows a random access into the compressed buffer, at the regular granularity of a DDR cacheline. A derived compression scheme is also applied to the compression of line buffers, in order to reduce the size and area of the on-chip memories.

Figure 4:
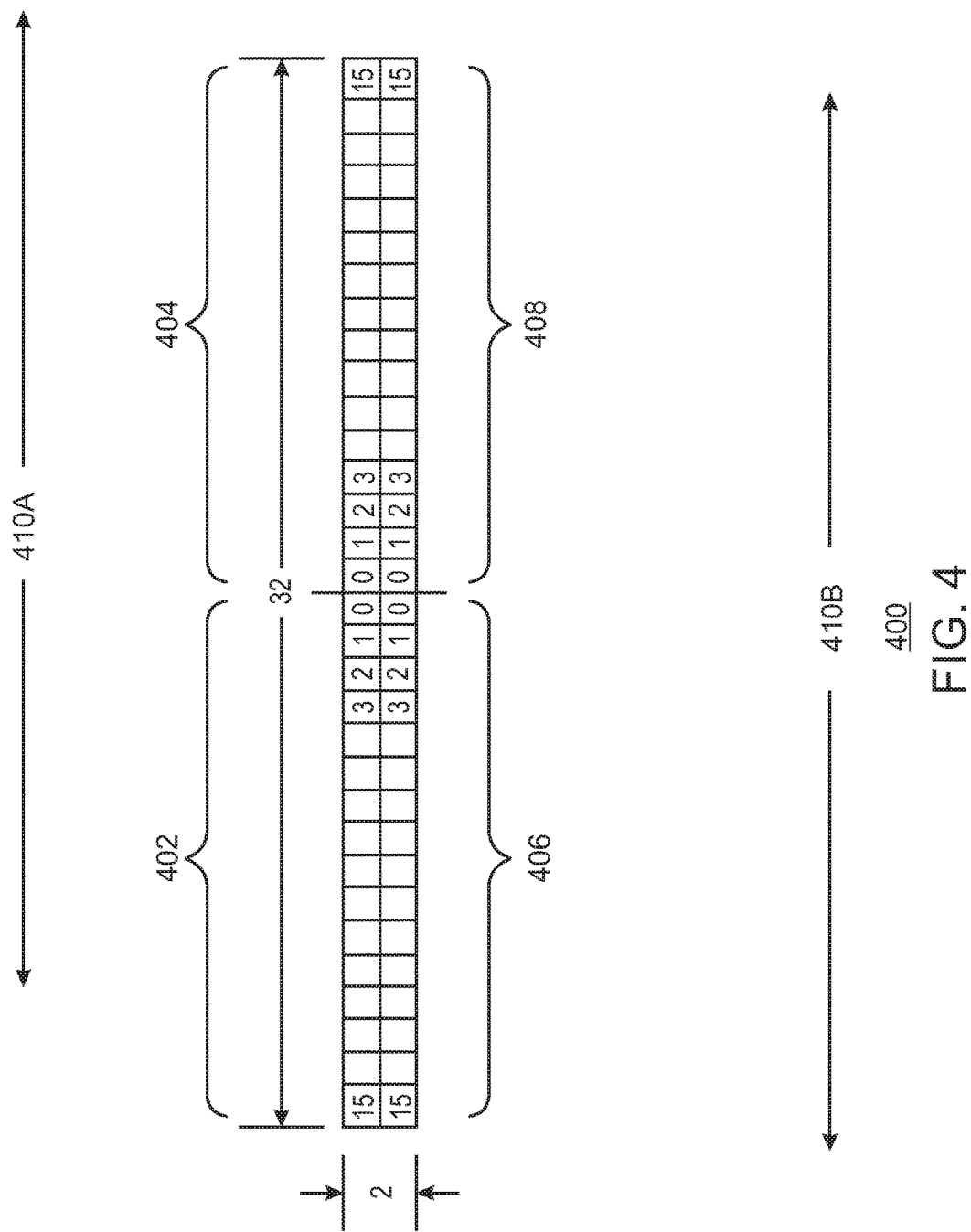
FIG. 4 is an illustration of a compression tile.

FIG. 4 is an illustration of a compression tile 400. The compression tile is defined as 32 pixels wide and 2 lines high, i.e., a tile of 32×2 pixel elements (e.g., Luma). In embodiments, the output of the processing system, such as the output operation at block 312, is done two cachelines at a time. Reading for the GDC at block 312B may be done as rectangles which contain a plurality of tetragons for processing, and the TNR 312A processing may be block based. In some cases, random access is applied to the intermediate DDR buffers 302. In embodiments, compression is applied to data as it is written/read to/from the DDR buffers. The compression may be performed done starting from the middle of the 32×2 compression tile outwards, in both directions concurrently, to a achieve a processing rate of four pixel values per clock cycle. Four values per cycle matches a typical IPU pipe processing throughput.

In embodiments, the adaptive bits may be spread across the block. Put another way, the locations where bits are dropped may be spread across the compression tile. Beginning processing of the compression tile in the middle gives a higher performance rate so the entire block can be processed in a single clock cycle. For example, the compression tile 400 may include a container 402, a container 404, a container 406, and a container 408. Each container is sixteen pixels wide. Processing the pixels stored in each container may be performed by beginning the processing in the middle of the compression tile. The processing may work in an outward fashion, as illustrated by the arrows 410A and 410B. Thus, the compression algorithm processes the compression of four pixels per cycle, by going from the middle outward, and compressing one pixel from each container.

Figure 5:
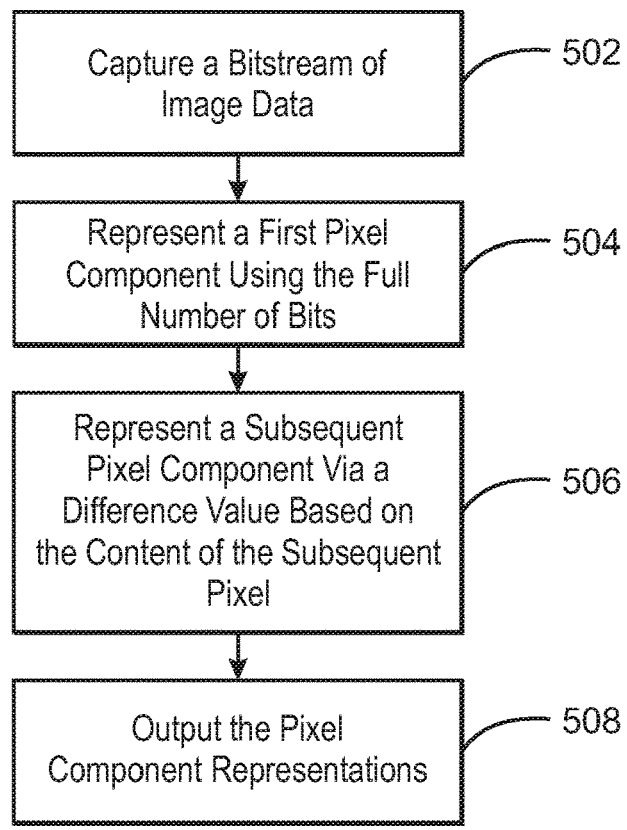
FIG. 5 is a process flow diagram of a method for near lossless compression.

FIG. 5 is a process flow diagram of a method for near lossless compression. At block 502, data from an image processing pipeline is used to form a bit stream, wherein the bit stream comprises a plurality of bits. The bitstream may be generated by determining a mode for each pixel. At block 504, in response to a first pixel component, the pixel values are represented using a full number of bits. At block 506, in response to a subsequent pixel component, the pixel values are encoded using a difference value, wherein the difference value is based on a prior pixel value and the number of bits used to represent the residual value is based on the content of the pixel value. At block 508, the pixel value may be output.

In embodiments, this differential pulse-code modulation (DPCM) compression has almost no impact on image quality of high dynamic range images. The results show no to minimal visible artifacts, when compressing 12-bit values into (average of) 8-bits per value. The block based compression tile configuration is 32×2 samples. The 10- (or 12-) bit values are compressed and packed into a 64-byte single cacheline (CL). This enables a random-access granularity at the compression tile boundaries, which is cacheline aligned, so it does not add additional constraints to DDR transactions.

In examples, the near lossless block compression and decompression are applied to two of the intermediate buffers in the IPU ISP processing pipeline, such as the TNR/GDC block 312 or the output stage 314. The first streams pair at DDR 302C is between the line based part of the IPU pipe and the beginning of the block based portion of the pipe, which starts with the Geometric Distortion Correction (GDC) 312B processing. The second streams pair at the DDR 302D is the Temporal Noise Reduction (TNR) processing reference image read and write streams. The DDR bandwidth of these streams is a significant component of the overall IPU DDR bandwidth consumption. The required DDR intermediate buffers footprint (size) is also reduced according to the compression factor.

While a single buffer is illustrated for each of the imaging operations, an image operation may use multiple buffers, each with compression applied to the data stored within the buffer. For example, TNR processing may include an unprocessed frame buffer, a first processed frame buffer, and a second processed frame buffer.

In embodiments, the output of the processing system at block 314 is done two lines at a time, reading for the GDC 312B is done as rectangles which contain the tetragons for processing, and the TNR 312A processing is block based. A random access is required into the intermediate DDR buffers such as 302C, 302D and 302E, thus a compression which handles full lines cannot be applied. If the compression is applied to full lines, a decompress step would need to process data from the beginning of the line in order to randomly access any pixel in the middle of the line, as needed for accessing a two dimensional (2D) block within an image. This is due to the decompression depending on the previous pixel that in turn depends on another previous pixel and so on until the first pixel is obtained. However, by compressing in chunks or segments of data, only the chunk or segment that contains the target pixel is decompressed. Moreover, the compress/decompress blocks typically execute on 32×2 components of same type. The compression is done starting from the middle of the 32×2 compression tile outwards, in both direction concurrently, thus it achieves the rate of 4 values per cycle (as indicated by the indices in FIG. 4), to match the IPU pipe processing throughput as described in FIG. 4. The compression can support either unsigned or signed values. The compression is based on natural images statistics where the difference between two adjacent pixels is usually small. Therefore, the algorithm compresses the differences and not the original pixel values.

Figure 6:
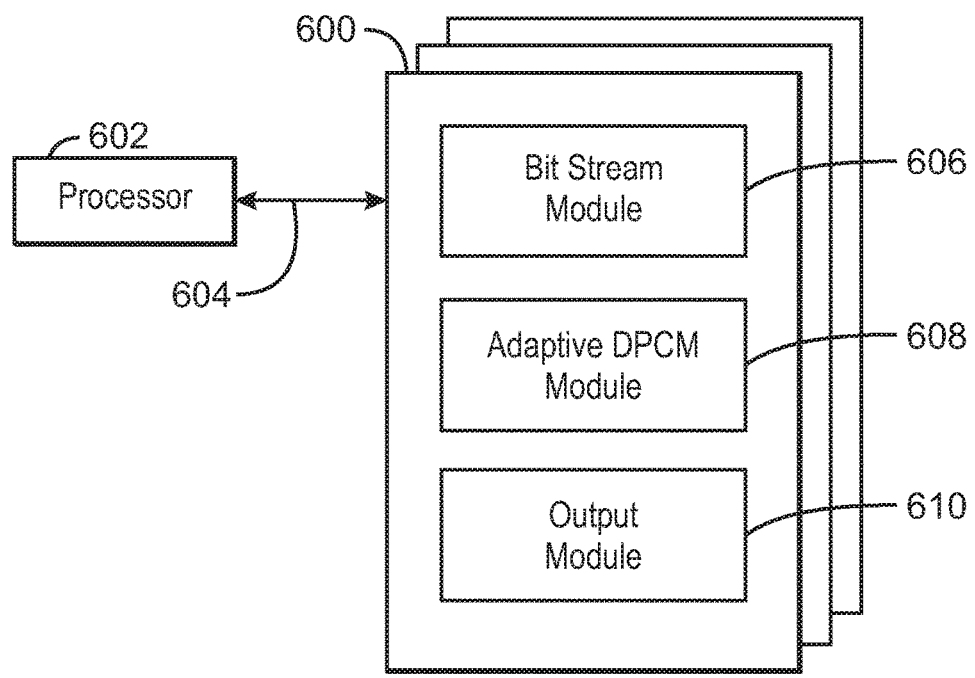
FIG. 6 is a block diagram showing a medium that contains logic for near lossless compression.

FIG. 6 is a block diagram showing a medium 600 that contains logic for near lossless compression. The medium 600 may be a computer-readable medium, including a non-transitory medium that stores code that can be accessed by a processor 602 over a computer bus 604. For example, the computer-readable medium 600 can be volatile or non-volatile data storage device. The medium 600 can also be a logic unit, such as an Application Specific Integrated Circuit (ASIC), a Field Programmable Gate Array (FPGA), or an arrangement of logic gates implemented in one or more integrated circuits, for example.

The medium 600 may include modules 606-610 configured to perform the techniques described herein. For example, a bitstream module 606 may be to capture imaging data from a sensor. An adaptive DPCM module 608 may be configured to adaptively represent each pixel component with a varying number of bits. An output module 610 may be configured to output the compressed data to a DDR buffer. In some embodiments, the modules 606-610 may be modules of computer code configured to direct the operations of the processor 602.

The block diagram of FIG. 6 is not intended to indicate that the medium 600 is to include all of the components shown in FIG. 6. Further, the medium 600 may include any number of additional components not shown in FIG. 6, depending on the details of the specific implementation.

Unlike regular DPCM schemes, the number of bits allocated for each pixels is not fixed, and is defined dynamically during the compression according to the present techniques. Since the first pixel is allocated more bits, some of the following coded differences are allocated less bits. For example, if the first (non-coded) value is allocated 10 bits, then two difference values should be coded with only 7 bits, and the rest of the differences can be coded using 8 bits. The selection of which values to be coded with less bits is done dynamically during the real time compressing of a compression tile, and it is content dependent.

The compressed tile fits within a cacheline. If the compression tile content can be compressed without loss of bits, that tile is losslessly compressed. If not enough values can be found to be coded with fewer bits as needed, the last values of the tile will be forced to be lossy compressed with one less bit for each, as needed. Thus, in embodiments, the compression is considered near lossless. Further, the parameters of the compression scheme (like the number of bits allocated, the various DPCM coding, etc.) can be configured and adjusted if needed.

Figure 7:
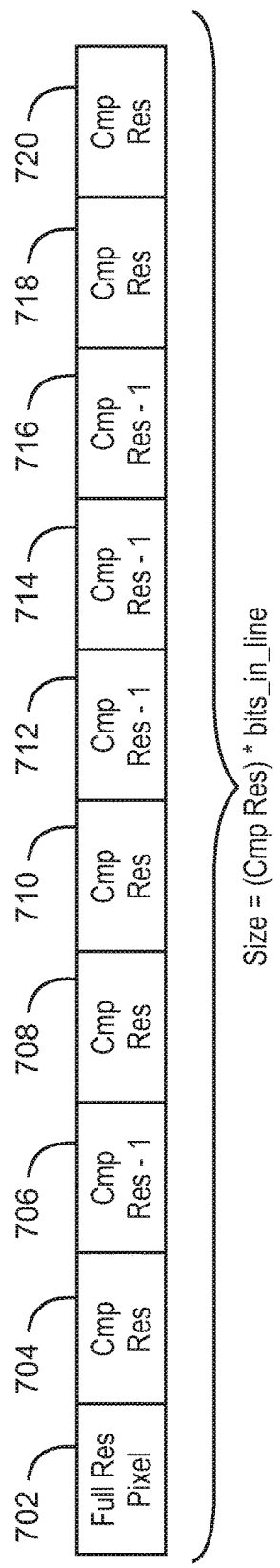
FIG. 7 is an illustration of a line buffer.

FIG. 7 is an illustration of a line buffer 700. While the present techniques have been described using a cachlines and compression tiles, the present techniques may be applied to any type of data storage. For example, the line buffer 700 includes 10 pixels adaptively encoded. The first pixel 702 is coded with the full number of 12 bits. The remaining pixels may be encoded with a reduced number of bits as possible in order to pack into an average of 8 bits. For example, pixel 704 is coded with 8 bits, while pixel 706 is coded with 7 bits. Pixels 708, 710, 718, and 720 are encoded with a complete resolution at 8-bits. Pixels 712, 714, and 716 are encoded with one less bit at 7-bits.

Thus, the present techniques may be used with line buffer compression as applied to an entire line to reduce the size of the line buffer. One pixel component is coded at a time, with the first pixel including as many bits as it can, and bits from the remaining pixels are reduced wherever possible. In compression using a line buffer, processing may begin from the beginning of the line and continue along the line where some pixels have less bits allocated along the line to result in an average of 8 bits per pixel, where the reduction of bits is selected in order to hit the average. Since the compression is done per each pixel component, it can be applied to Bayer, YUV, or RGB, formats.

The near lossless compression on line-buffers can be used to reduce internal memory sizes. Hardware implementation of various image processing algorithms requires many line buffers to store history and support for the applied processing filters. The compression described herein is done at a line based processing part of the IPU pipeline, the compression should handle full lines. A similar near lossless compression concept of allocating variable number of bits along a series of compressed values can also be applied to internal line buffers in order to save area in memory.

Example 1 is an apparatus for a near lossless compression scheme for processing high dynamic range (HDR) images. The apparatus includes an image processing pipeline to apply a plurality of processing stages to high dynamic range images to output a plurality of intermediate processed images, wherein each image comprises a plurality of pixel components; a compressor to generate compression tiles of the plurality of intermediate processed images, wherein each output of the plurality of processing stages is compressed independently of the other processing stage.

Example 2 includes the apparatus of example 1, including or excluding optional features. In this example, the compressor applies a differential pulse-code modulation (DPCM) compression to the output of each processing stage.

Example 3 includes the apparatus of any one of examples 1 to 2, including or excluding optional features. In this example, the compressor is to adaptively select bits of each pixel component to drop base on local similarities. Optionally, local similarities are determined for the output of each processing stage, and bits are dropped during compression when the out is redundant based on the local similarities.

Example 4 includes the apparatus of any one of examples 1 to 3, including or excluding optional features. In this example, a value to be encoded during compression is based on a difference between a current pixel and a previous pixel.

Example 5 includes the apparatus of any one of examples 1 to 4, including or excluding optional features. In this example, a number of bits allocated to each compressed pixel is adaptive across an entire compression block.

Example 6 includes the apparatus of any one of examples 1 to 5, including or excluding optional features. In this example, the number of bits used to encode each pixel value is not fixed.

Example 7 includes the apparatus of any one of examples 1 to 6, including or excluding optional features. In this example, each compression tile comprises four adaptively encoded pixel values.

Example 8 includes the apparatus of any one of examples 1 to 7, including or excluding optional features. In this example, an average of 8-bits per pixel is used to pack 64-pixel elements within a 64-byte cacheline.

Example 9 includes the apparatus of any one of examples 1 to 8, including or excluding optional features. In this example, the number of bits used to represent each pixel component during compression is variable.

Example 10 is a method for a near lossless compression scheme for processing high dynamic range (HDR) images. The method includes processing a plurality of pixels via an image signal processing pipeline; in response to a first pixel output by an intermediate processing stage of the image signal processing pipeline, storing a pixel component of the first pixel uncompressed; in response to a subsequent pixel output by the intermediate processing stage of the image signal processing pipeline, storing a pixel component of the subsequent pixel via a compressed difference value; and dropping bits of at least one pixel component of the subsequent pixel such that the number of bits used to represent each pixel value is dynamically adaptive.

Example 11 includes the method of example 10, including or excluding optional features. In this example, the difference value is a difference between a current pixel component and a previous pixel component.

Example 12 includes the method of any one of examples 10 to 11, including or excluding optional features. In this example, a differential pulse-code modulation (DPCM) compression is applied to compress each subsequent pixel component.

Example 13 includes the method of any one of examples 10 to 12, including or excluding optional features. In this example, the intermediate processing stage of the image signal processing pipeline is at least one of geometric distortion correction (GDC), temporal noise reduction (TNR) processing, or output stage processing.

Example 14 includes the method of any one of examples 10 to 13, including or excluding optional features. In this example, dropping bits of at least one pixel component of the subsequent pixel comprises dropping the least significant bit of the at least one pixel component.

Example 15 includes the method of any one of examples 10 to 14, including or excluding optional features. In this example, the method includes determining local similarities between the output of the intermediate processing stage of the image signal processing pipeline between a current frame and a previous frame, and dropping bits of at least one pixel component of the current frame when bits are redundant based on the local similarities.

Example 16 includes the method of any one of examples 10 to 15, including or excluding optional features. In this example, the pixel component of the first pixel and the pixel component of the subsequent pixel are stored in a memory in a tile configuration. Optionally, the tile is processed from the middle of the tile outwards. Optionally, an entire compression tile is processed each clock cycle.

Example 17 includes the method of any one of examples 10 to 16, including or excluding optional features. In this example, the pixel component of the first pixel and the pixel component of the subsequent pixel are stored in a memory in a tile configuration, and the dropped bits are spread across the tile.

Example 18 is a system for a near lossless compression scheme for processing high dynamic range (HDR) images. The system includes a memory that is to store instructions and a plurality of compression tiles; and an image signal processor communicatively coupled to the memory comprising a plurality of intermediate processing stages, wherein when the image signal processor is to execute the instructions, the processor is to: process a plurality of pixels via an image signal processing pipeline; in response to a first pixel output by an intermediate processing stage of the image signal processing pipeline, storing a pixel component of the first pixel uncompressed in a compression tile; in response to a subsequent pixel output by the intermediate processing stage of the image signal processing pipeline, store a pixel component of the subsequent pixel via a compressed difference value in the compression tile; and dropping bits of at least one pixel component of the subsequent pixel such that the number of bits used to represent each pixel value is dynamically adaptive.

Example 19 includes the system of example 18, including or excluding optional features. In this example, the memory is a double data rate (DDR) memory.

Example 20 includes the system of any one of examples 18 to 19, including or excluding optional features. In this example, the memory include intermediate buffers to store intermediate values of the image signal processing pipeline.

Example 21 includes the system of any one of examples 18 to 20, including or excluding optional features. In this example, data is stored in the compression tile by processing data in the compression tile from a middle of the compression tile outwards.

Example 22 includes the system of any one of examples 18 to 21, including or excluding optional features. In this example, the compression tile comprises four pixel values, four pixel values are processed each clock cycle.

Example 23 includes the system of any one of examples 18 to 22, including or excluding optional features. In this example, the pixel component of the first pixel and the pixel component of the subsequent pixel are stored in a memory in a tile configuration, and the dropped bits are spread across the tile.

Example 24 includes the system of any one of examples 18 to 23, including or excluding optional features. In this example, the compressed difference value is a difference between a current pixel component and a previous pixel component.

Example 25 includes the system of any one of examples 18 to 24, including or excluding optional features. In this example, a differential pulse-code modulation (DPCM) compression is applied to compress each subsequent pixel component.

Example 26 includes the system of any one of examples 18 to 25, including or excluding optional features. In this example, the intermediate processing stage of the image signal processing pipeline is at least one of geometric distortion correction (GDC), temporal noise reduction (TNR) processing, or output stage processing.

Example 27 includes the system of any one of examples 18 to 26, including or excluding optional features. In this example, the system includes determining local similarities between the output of the intermediate processing stage of the image signal processing pipeline between a current frame and a previous frame, and dropping bits of at least one pixel component of the current frame when bits are redundant based on the local similarities.

Example 28 is a tangible, non-transitory, computer-readable medium. The computer-readable medium includes instructions that direct the processor to process a plurality of pixels via an image signal processing pipeline; in response to a first pixel output by an intermediate processing stage of the image signal processing pipeline, store a pixel component of the first pixel uncompressed; in response to a subsequent pixel output by the intermediate processing stage of the image signal processing pipeline, store a pixel component of the subsequent pixel via a compressed difference value; and drop bits of at least one pixel component of the subsequent pixel such that the number of bits used to represent each pixel value is dynamically adaptive.

Example 29 includes the computer-readable medium of example 28, including or excluding optional features. In this example, the difference value is a difference between a current pixel component and a previous pixel component.

Example 30 includes the computer-readable medium of any one of examples 28 to 29, including or excluding optional features. In this example, a differential pulse-code modulation (DPCM) compression is applied to compress each subsequent pixel component.

Example 31 includes the computer-readable medium of any one of examples 28 to 30, including or excluding optional features. In this example, the intermediate processing stage of the image signal processing pipeline is at least one of geometric distortion correction (GDC), temporal noise reduction (TNR) processing, or output stage processing.

Example 32 includes the computer-readable medium of any one of examples 28 to 31, including or excluding optional features. In this example, dropping bits of at least one pixel component of the subsequent pixel comprises dropping the least significant bit of the at least one pixel component.

Example 33 includes the computer-readable medium of any one of examples 28 to 32, including or excluding optional features. In this example, the computer-readable medium includes determining local similarities between the output of the intermediate processing stage of the image signal processing pipeline between a current frame and a previous frame, and dropping bits of at least one pixel component of the current frame when bits are redundant based on the local similarities.

Example 34 includes the computer-readable medium of any one of examples 28 to 33, including or excluding optional features. In this example, the pixel component of the first pixel and the pixel component of the subsequent pixel are stored in a memory in a tile configuration. Optionally, the tile is processed from the middle of the tile outwards. Optionally, an entire compression tile is processed each clock cycle.

Example 35 includes the computer-readable medium of any one of examples 28 to 34, including or excluding optional features. In this example, the pixel component of the first pixel and the pixel component of the subsequent pixel are stored in a memory in a tile configuration, and the dropped bits are spread across the tile.

Example 36 is an apparatus for a near lossless compression scheme for processing high dynamic range (HDR) images. The apparatus includes instructions that direct the processor to an image processing pipeline to apply a plurality of processing stages to high dynamic range images to output a plurality of intermediate processed images, wherein each image comprises a plurality of pixel components; a means to generate compression tiles of the plurality of intermediate processed images, wherein each output of the plurality of processing stages is compressed independently of the other processing stage.

Example 37 includes the apparatus of example 36, including or excluding optional features. In this example, the means to generate compression tiles applies a differential pulse-code modulation (DPCM) compression to the output of each processing stage.

Example 38 includes the apparatus of any one of examples 36 to 37, including or excluding optional features. In this example, the means to generate compression tiles is to adaptively select bits of each pixel component to drop base on local similarities. Optionally, local similarities are determined for the output of each processing stage, and bits are dropped during compression when the out is redundant based on the local similarities.

Example 39 includes the apparatus of any one of examples 36 to 38, including or excluding optional features. In this example, a value to be encoded during compression is based on a difference between a current pixel and a previous pixel.

Example 40 includes the apparatus of any one of examples 36 to 39, including or excluding optional features. In this example, a number of bits allocated to each compressed pixel is adaptive across an entire compression block.

Example 41 includes the apparatus of any one of examples 36 to 40, including or excluding optional features. In this example, the number of bits used to encode each pixel value is not fixed.

Example 42 includes the apparatus of any one of examples 36 to 41, including or excluding optional features. In this example, each compression tile comprises four adaptively encoded pixel values.

Example 43 includes the apparatus of any one of examples 36 to 42, including or excluding optional features. In this example, an average of 8-bits per pixel is used to pack 64-pixel elements within a 64-byte cacheline.

Example 44 includes the apparatus of any one of examples 36 to 43, including or excluding optional features. In this example, the number of bits used to represent each pixel component during compression is variable.

It is to be understood that specifics in the aforementioned examples may be used anywhere in one or more embodiments. For instance, all optional features of the computing device described above may also be implemented with respect to either of the methods or the computer-readable medium described herein. Furthermore, although flow diagrams and/or state diagrams may have been used herein to describe embodiments, the inventions are not limited to those diagrams or to corresponding descriptions herein. For example, flow need not move through each illustrated box or state or in exactly the same order as illustrated and described herein The inventions are not restricted to the particular details listed herein. Indeed, those skilled in the art having the benefit of this disclosure will appreciate that many other variations from the foregoing description and drawings may be made within the scope of the present inventions. Accordingly, it is the following claims including any amendments thereto that define the scope of the inventions.

What is claimed is:

1. An apparatus for a near lossless compression scheme for processing high dynamic range (HDR) images, comprising:
   an image processing pipeline to apply a plurality of processing stages to high dynamic range images to output a plurality of intermediate processed images, wherein each image of the high dynamic range images comprises a plurality of pixel components; and
   a processor to generate compression tiles of the plurality of intermediate processed images, wherein each output of the plurality of processing stages is compressed independently of the other processing stage via a dynamic adaptive differential pulse code modulation (DPCM) encoding scheme applied at each processing stage of the plurality of processing stages.

2. The apparatus of claim 1, wherein the processor applies a differential pulse-code modulation (DPCM) compression to the output of each processing stage.

3. The apparatus of claim 1, wherein the processor is to adaptively select bits of each pixel component to drop base on local similarities.

4. The apparatus of claim 3, wherein local similarities are determined for the output of each processing stage, and bits are dropped during compression when the output is redundant based on the local similarities.

5. The apparatus of claim 1, wherein a value to be encoded during compression is based on a difference between a current pixel and a previous pixel.

6. The apparatus of claim 1, wherein a number of bits allocated to each compressed pixel is adaptive.

7. The apparatus of claim 1, wherein the number of bits used to encode each pixel component of the plurality of pixel components is not fixed.

8. The apparatus of claim 1, wherein each compression tile comprises four adaptively encoded pixel components.

9. The apparatus of claim 1, wherein an average of 8-bits per pixel is used to pack 64-pixel elements within a 64-byte cacheline.

10. The apparatus of claim 1, wherein the number of bits used to represent each pixel component during compression is variable.

11. A method for a near lossless compression scheme for processing high dynamic range (HDR) images, comprising:
    processing a plurality of pixels via an image signal processing pipeline;
    in response to a first pixel output by an intermediate processing stage of the image signal processing pipeline, storing a pixel component of the first pixel uncompressed;
    in response to a subsequent pixel output by the intermediate processing stage of the image signal processing pipeline, storing a pixel component of the subsequent pixel via a compressed difference value between a current pixel component and a previous pixel component; and
    during compression, dropping bits of at least one pixel component of the subsequent pixel such that the number of bits used to represent each pixel component of the plurality of pixel components is dynamically adaptive.

12. The method of claim 11, wherein a differential pulse-code modulation (DPCM) compression is applied to compress each subsequent pixel component.

13. The method of claim 11, wherein the intermediate processing stage of the image signal processing pipeline is at least one of geometric distortion correction (GDC), temporal noise reduction (TNR) processing, or output stage processing.

14. The method of claim 11, wherein dropping bits of at least one pixel component of the subsequent pixel comprises dropping the least significant bit of the at least one pixel component.

15. The method of claim 11, comprising determining local similarities between the output of the intermediate processing stage of the image signal processing pipeline between a current frame and a previous frame, and dropping bits of at least one pixel component of the current frame when bits are redundant based on the local similarities.

16. A system for a near lossless compression scheme for processing high dynamic range (HDR) images, comprising:
    a memory that is to store instructions and a plurality of compression tiles; and
    an image signal processor communicatively coupled to the memory comprising a plurality of intermediate processing stages, wherein when the image signal processor is to execute the instructions, the processor is to:
    process a plurality of pixels via an image signal processing pipeline;
    in response to a first pixel output by an intermediate processing stage of the image signal processing pipeline, storing a pixel component of the first pixel uncompressed in a compression tile;

in response to a subsequent pixel output by the intermediate processing stage of the image signal processing pipeline, store a pixel component of the subsequent pixel via a compressed difference value between a current pixel component and a previous pixel component in the compression tile; and during compression, dropping bits of at least one pixel component of the subsequent pixel such that the number of bits used to represent each pixel component is dynamically adaptive.

17. The system of claim 16, wherein the memory is a double data rate (DDR) memory.

18. The system of claim 16, wherein the memory include intermediate buffers to store intermediate values of the image signal processing pipeline.

19. The system of claim 16, wherein data is stored in the compression tile by processing data in the compression tile from a middle of the compression tile outwards.

20. The system of claim 16, wherein the compression tile comprises four pixel components, and four pixel components are processed each clock cycle.

21. The system of claim 16, wherein the pixel component of the first pixel and the pixel component of the subsequent pixel are stored in a memory in a tile configuration, and the dropped bits are spread across the tile.

22. A tangible, non-transitory, computer-readable medium comprising instructions that, when executed by a processor, direct the processor to:

process a plurality of pixels via an image signal processing pipeline;

in response to a first pixel output by an intermediate processing stage of the image signal processing pipeline, store a pixel component of the first pixel uncompressed;

in response to a subsequent pixel output by the intermediate processing stage of the image signal processing pipeline, store a pixel component of the subsequent pixel via a compressed difference value between a current pixel component and a previous pixel component; and during compression, drop bits of at least one pixel component of the subsequent pixel such that the number of bits used to represent each pixel component is dynamically adaptive.

23. The computer readable medium of claim 22, wherein the pixel component of the first pixel and the pixel component of the subsequent pixel are stored in a memory in a tile configuration.

24. The computer readable medium of claim 22, wherein the pixel component of the first pixel and the pixel component of the subsequent pixel are stored in a memory in a tile configuration, and the dropped bits are spread across the tile.

* * * * *